US007818397B2

(12) United States Patent
Jiang et al.

(10) Patent No.: US 7,818,397 B2
(45) Date of Patent: *Oct. 19, 2010

(54) PROVIDING A SERVER AGENT FOR A MOBILE DEVICE WITH REFRESH

(75) Inventors: Zhaowei Charlie Jiang, Palo Alto, CA (US); Yingqing Lawrence Cui, San Jose, CA (US); Min Zhou, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/030,129

(22) Filed: Feb. 12, 2008

(65) Prior Publication Data
US 2008/0139177 A1 Jun. 12, 2008

Related U.S. Application Data

(63) Continuation of application No. 10/969,404, filed on Oct. 19, 2004, now Pat. No. 7,356,572.

(60) Provisional application No. 60/518,989, filed on Nov. 10, 2003.

(51) Int. Cl.
*G06F 15/16* (2006.01)
*G06F 11/00* (2006.01)

(52) U.S. Cl. ............................ 709/217; 709/219; 714/4

(58) Field of Classification Search ................ 709/217, 709/219; 714/4
See application file for complete search history.

(56) References Cited

U.S. PATENT DOCUMENTS

| 5,758,088 A | 5/1998 | Bezaire et al. |
| 6,021,433 A | 2/2000 | Payne et al. |
| 6,167,426 A | 12/2000 | Payne et al. |
| 6,212,548 B1 | 4/2001 | DeSimone et al. |

(Continued)

FOREIGN PATENT DOCUMENTS

JP 08-009053 1/1996

(Continued)

OTHER PUBLICATIONS

Notification of Transmittal of the International Search Report and the Written Opinion of the International Searching Authority, or the Declaration dated Feb. 21, 2006, 11 pages.

*Primary Examiner*—Larry Donaghue
*Assistant Examiner*—Brian J Gillis
(74) *Attorney, Agent, or Firm*—Frommer Lawrence & Haug LLP; Jamie L. Wiegand

(57) ABSTRACT

The invention enables one or more agents to gather information from at least one server on a network and automatically provide this information to an inbox on a server and then providing it to an inbox on a mobile device if a wireless connection to the mobile device is available. A server agent facility provides for preprocessing requests for information from the mobile device, including, collecting the information out of band, filtering the collected information, and packaging the information for delivery in a format suitable for the mobile device. A server agent within the server agent facility may actively collect the information based on a variety of factors, including but not limited to, time, event(s), user profile, mobile device profile, request(s), alert(s), and historical behavior.

20 Claims, 12 Drawing Sheets

U.S. PATENT DOCUMENTS

| | | |
|---|---|---|
| 6,442,593 B1 | 8/2002 | Wang et al. |
| 6,735,614 B1 | 5/2004 | Payne et al. |
| 6,947,451 B1 | 9/2005 | Dommety et al. |
| 2001/0011366 A1 | 8/2001 | Beck et al. |
| 2001/0054087 A1 | 12/2001 | Flom et al. |
| 2002/0143871 A1 | 10/2002 | Meyer et al. |
| 2003/0093311 A1 | 5/2003 | Knowlson |
| 2003/0191689 A1 | 10/2003 | Bosarge et al. |
| 2004/0015504 A1* | 1/2004 | Ahad et al. ................ 707/100 |
| 2004/0024824 A1* | 2/2004 | Ferguson et al. ............ 709/206 |
| 2004/0128347 A1 | 7/2004 | Mason et al. |
| 2004/0205068 A1* | 10/2004 | Iyer et al. .................... 707/10 |

FOREIGN PATENT DOCUMENTS

| | | |
|---|---|---|
| WO | 98/02824 | 1/1998 |
| WO | 99/63709 | 12/1999 |
| WO | WO-01/78319 | 10/2001 |

\* cited by examiner

PROVIDING A SERVER AGENT FOR A MOBILE DEVICE WITH REFRESH

CROSS-REFERENCE TO RELATED APPLICATIONS

The present application is a continuation patent application of U.S. patent application Ser. No. 10/969,404, filed Oct. 19, 2004, entitled "Method, Apparatus and System For Providing A Server Agent For A Mobile Device," and claims benefit under 35 U.S.C. §120, and further claims benefit under 35 U.S.C. §119 to provisional application Ser. No. 60/518,989 entitled "Method, Apparatus, and System for Providing a Server Agent for a Mobile Device," filed on Nov. 10, 2003, each of which is incorporated herein by reference.

FIELD OF THE INVENTION

The invention relates generally to information gathering, and more particularly, but not exclusively, to employing an agent to gather information out of band for use with a mobile device.

BACKGROUND OF THE INVENTION

Generally, an agent is an application that performs some type of information gathering and/or processing in the background of another application operating in the foreground. Typically, an agent program has a relatively small and well-defined task. For example, as the Internet has grown, agents have become more prominent for information gathering related to search requests. Information gathered by an agent can be pulled, or pushed to another application operating in the foreground. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

In the following detailed description, reference is made to the accompanied drawings in which are shown specific exemplary embodiments of the invention. These embodiments are described in sufficient detail to enable those skilled in the art to practice the invention, and it is understood that other embodiments may be utilized, and other changes may be made, without departing from the spirit or scope of the invention. The following detailed description is, therefore, not to be taken in a limiting sense, and the scope of the invention is defined only by the appended claims.

Briefly stated, the present invention enables a facility with one or more server agents to gather information from at least one resource on a network and automatically provide this information in a suitable format to an inbox of a mobile device. The server agent facility provides processes for preprocessing requests for information, collecting the information out of band, filtering the collected information, and packaging the information for delivery in a format suitable for the mobile device's inbox. A server agent can independently collect and process information based on at least one factor, including but not limited to, time, event(s), user profile, mobile device profile, request (s), alert(s), historical data, behavior data, and the like.

Different type of server agents may be employed by the server agent facility to collect information, including but not limited to, an editor, a search agent, an alert agent, and a forward looking agent. Collection modules are employed by the server agent facility to collect information for preprocessing by the server agents including a module for collecting information provided by third party agents and a proactive fetch module that collects information for preprocessing by the server agents.

A packaging module packages the collected information in at least one format suitable for use with a mobile device, including but not limited to, Wireless Application Protocol (WAP), and the like. Additionally, the packaging module can provide encryption and compression to package collected information in a format suitable for delivery to the inbox of a mobile device.

An interface module enables the server agent facility to provide the preprocessed collected information in response to a retrieval request or automatically push the information to the inbox of a mobile device.

Illustrative Operating Environment

Figure 1:
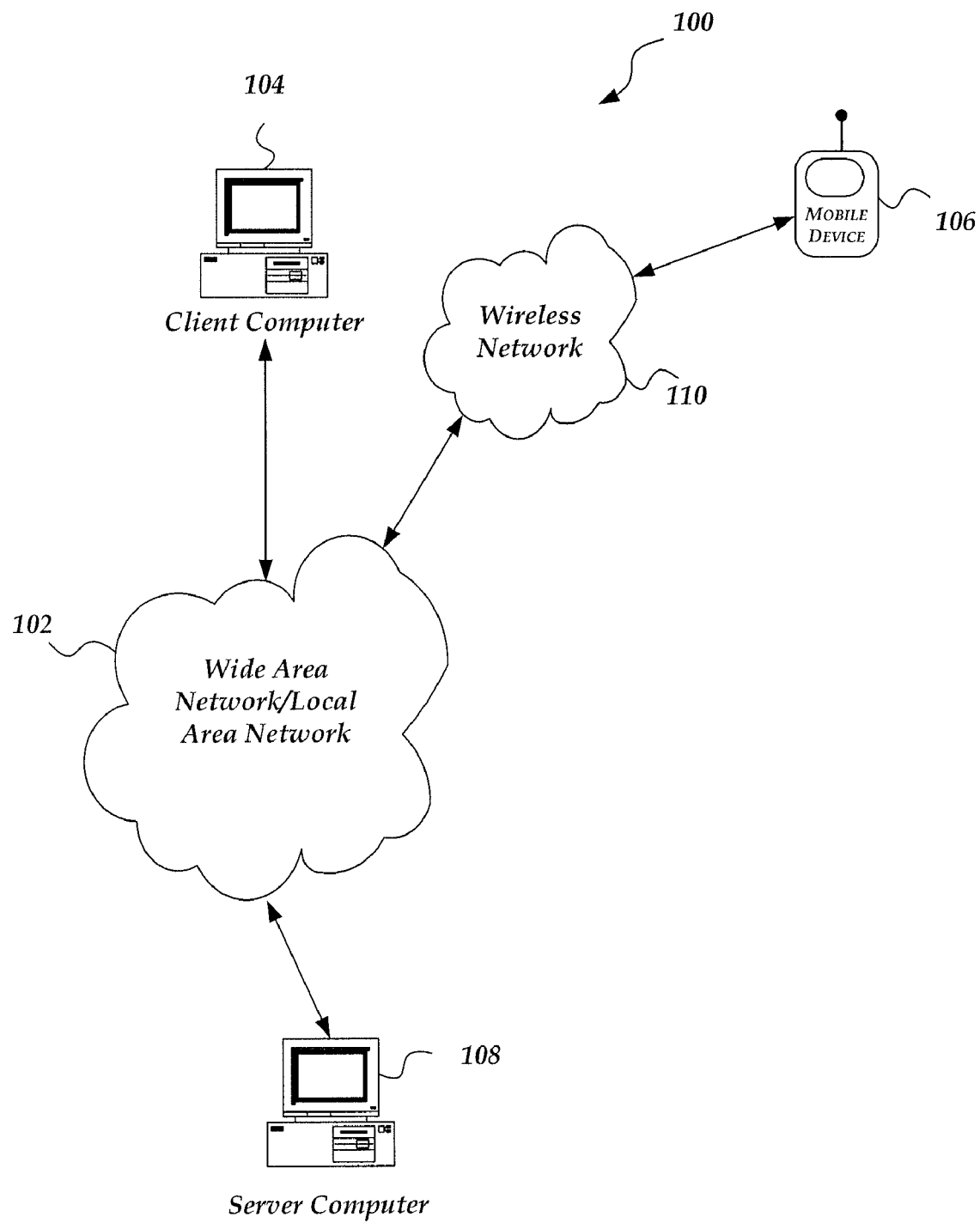
FIG. 1 shows a functional block diagram illustrating one embodiment of an environment for practicing the invention.

FIG. 1 shows components of an exemplary environment in which the invention may be practiced. Not all the components may be required to practice the invention, and variations in the arrangement and type of the components may be made without departing from the spirit or scope of the invention.

In FIG. 1, one or more local area networks ("LANs") and/or wide area networks ("WAN") are included in a network 102, such as the Internet, that enables communication between various users, devices, servers, agents, modules, clients, processes, and the like. As shown, client computer 104, and server computer 108, employ network 102 to communicate with each other, and similar devices. Wireless network 110 is connected to network 102. Wireless network 110 may include various components, such as servers, messaging centers, and towers which are employed to provide wireless connectivity to mobile devices. Many of these components are interconnected by wires; the wireless designation applies to the devices using the wireless network, and not to those representing its structure. The connection between wireless network 110 and network 102 may be realized by a variety of known methods, such as, for example, by the use of a gateway. Mobile device 106 can couple to wireless network 110 using a wireless communications medium. Also, the mobile device can include a mobile telephone, smart phone, pager, walkie talkie, radio frequency (RF) device, infrared (IR) device, Wi-Fi device, and integrated devices combining one or more of the preceding devices, and the like. Although not shown, mobile device 106 can include an inbox for a messaging facility, such as email, instant messaging (IM), short messaging service (SMS), and the like.

Although not shown, the LANs and WANs of network 102 are typically interconnected by routers and/or switches. Also, communication links within the LANs and WANS can include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, and the like. Furthermore, the number of WANs and LANs in FIG. 1 may be increased or decreased arbitrarily without departing from the spirit or scope of this invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Server computer 108 can include, among other components, a central processing unit (processor), a memory for storing instructions, and a network interface unit connected via a bus. The processor in combination with instructions stored in the memory enable the operation of one or more applications executing on server computer 108. These applications can include, but are not limited to, servers, clients, protocols, interfaces, compilers, translators, modules, agents, and the like.

For server computer 108, the network interface unit includes the necessary circuitry for connecting the server computer to network 102, and is constructed for use with various communication protocols including, but not limited to, TCP/IP, UDP/IP, SMS, IM, and WAP. The network interface unit may include or interface with circuitry and components for communicating information, such as graphical displays, advertiser data, and the like, over a wired and/or wireless communications medium. The network interface unit can sometimes be referred to as a transceiver.

Figure 2:
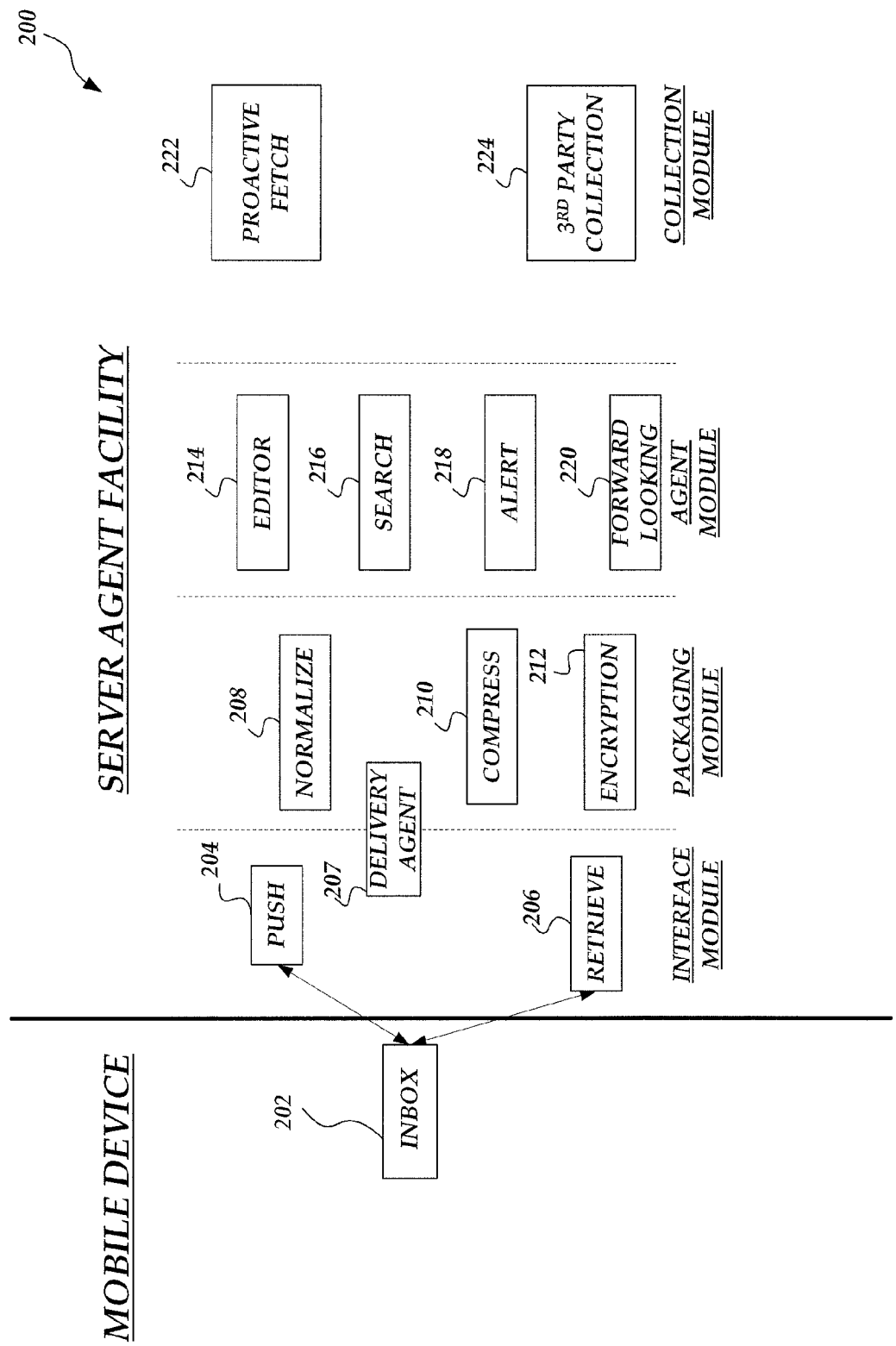
FIG. 2 shows one embodiment of an overview of components employable by a mobile device and a server agent facility.

FIG. 2 illustrates overview 200 of an architecture for communication between a mobile device and a server agent facility. The mobile device (not shown) includes inbox 202 which is in communication with a messaging facility (not shown) operating on the mobile device, such as email, SMS, IM, and the like. The server agent facility operates on at least one server computer, client computer, or host computer, and the like (not shown).

As shown, the server agent facility includes at least four categories of modules that are in communication with each other: an interface module, a packaging module, agent module, and a collection module. The interface module enables communication of collected and preprocessed information to inbox 202 when a wireless connection to the mobile device occurs and when a sufficient bandwidth is determined to be available to provide the collected and preprocessed information.

The interface module may include push component 204 and retrieve component 206. Push component 204 is configured to provide collected and preprocessed information automatically to inbox 202 of the mobile device, if a wireless connection is available. Retrieve component 206 is configured to provide substantially similar information to inbox 202 in response to a request from the mobile device, if a wireless connection is available.

Situated between the interface module and the packaging module is delivery agent 205. Delivery agent 205 is configured to monitor the mobile device to determine if it is available. If the mobile device is available, delivery agent 205 may provide responses from a temporary inbox residing on a server to an inbox on the mobile device through the interface module.

The packaging module is configured to package collected and preprocessed information in a format suitable for inbox 202. Depending on the characteristics of inbox 202, the packaging module may employ normalize component 208 to arrange the collected and preprocessed information, compress component 210 to compress information, and/or encryption component 212 to encrypt information.

The agent module includes various types of agents that may be employed to enable the collection and/or preprocessing of information. These agents can include editor agent 214 for editing collected information. For example, editor agent 214 may be used to determine a top ten result provided by a search. The agent module may also include search agent 216, which can be employed to collect information related to a query. Alert agent 218 may also be included within the agent module to collect information related to an event (alert), such as a change in a price of stock, a change in weather, a press release, and the like. Moreover, as shown in the figure, agent module may also include forward looking agent 220, which can be employed to use a profile, such as for the mobile device, a user, and the like, and to use historical and/or behavior data to predict information that might be useful. Such historical and/or behavior data might include, for example, a search for an airplane ticket, directions in a particular city not associated with a current location of the mobile device, as well as similar behavior related information. Based on the historical and/or behavior data, forward looking agent 220 could predict that collecting weather information in that particular city would be useful. Forward looking agent 220 could then collect this predicted information so that it may be provided to inbox 202. Additionally, forward looking agent 220 also may be employed to provide statistical, forecast, and similar information for use by the mobile device.

Although only four types of agents are illustrated in FIG. 2, the invention is not so limited, and almost any other type of agent may be included whose operation is at least indirectly related to collection and/or preprocessing of information that may be useable by the mobile device.

The collection module within the server agent facility is configured to enable information to be collected out of band of an operation with the mobile device. The collection module includes proactive fetch component 222 and third party collection component 224. Proactive fetch component 222 may be employed to collect information indicated by an agent within the agent module. Third party collection component 224 is useable to collect information indicated by an agents and/or program that may not be directly a part of the server agent facility. One such agent may include an external agent that is arranged to provide airline ticket information in response to a query. Typically, this type of information is collected in a batch approach; however, the invention is not so limited, and other approaches and external agents may also be employed.

Figure 3:
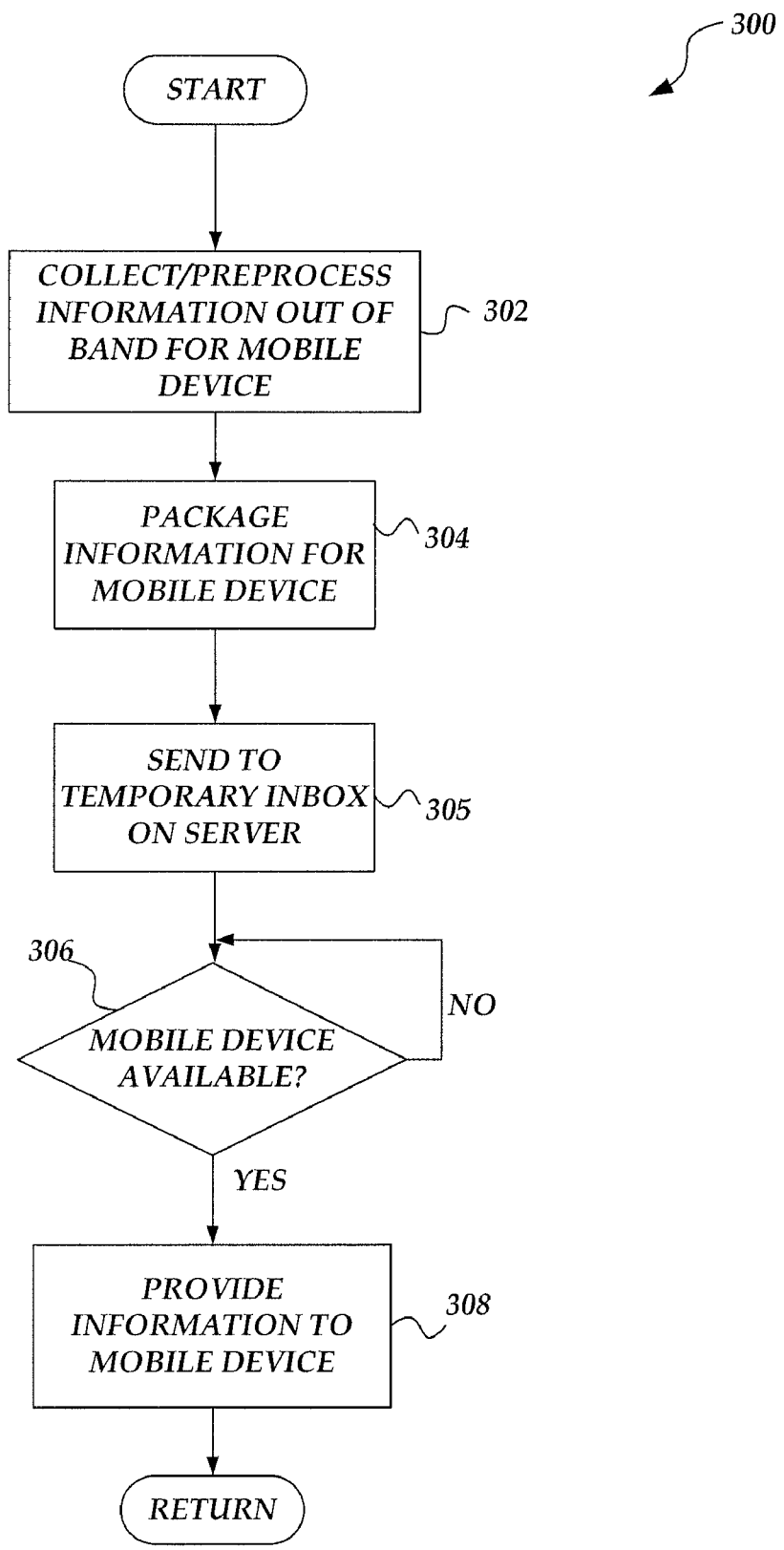
FIG. 3 illustrates a logical flow diagram generally showing one embodiment of a process for use in collecting information for an inbox associated with a mobile device.

FIG. 3 illustrates a logical flow diagram generally showing one embodiment of process 300 for use in collecting information for an inbox associated with a mobile device. Process 300 may be implemented, for example, on server computer 108 of FIG. 1.

Process 300 begins, after a start block, at block 302 where information is collected out of band of an operation with the mobile device. The collected information may then be preprocessed employing an agent in a server agent facility, such as shown in FIG. 2. The collection and preprocessing of the information by the agent may be automatically configured and at least partially selected based on any of a variety of criterion, including, but not limited to, time, a preference, profile, condition, event, historical data, behavior data, and the like.

Process 300 flows next to block 304 where the information is packaged in a format suitable for delivery to an inbox of the mobile device. Process 300 continues next to block 305 where the packaged information is sent a temporary inbox that may reside on a server computer, such as server computer 108 of FIG. 1, or the like.

Process 300 next continues to decision block 306, a determination is made whether the inbox of the mobile device is available. This determination is typically performed by a delivery agent and is based on if a network connection is present and a sufficient bandwidth is available to the mobile device. If the mobile device's inbox is unavailable or the bandwidth is insufficient, the process loops through decision block 306 to wait until the mobile device is available. However, if the determination at decision block 306 is true, the process advances to block 308 where the preprocessed/collected information is provided by the delivery agent to an interface module that is enabled to provide the information to the inbox of the mobile device. Upon completion of process 300, processing returns to a calling process to perform other actions.

Figure 4:
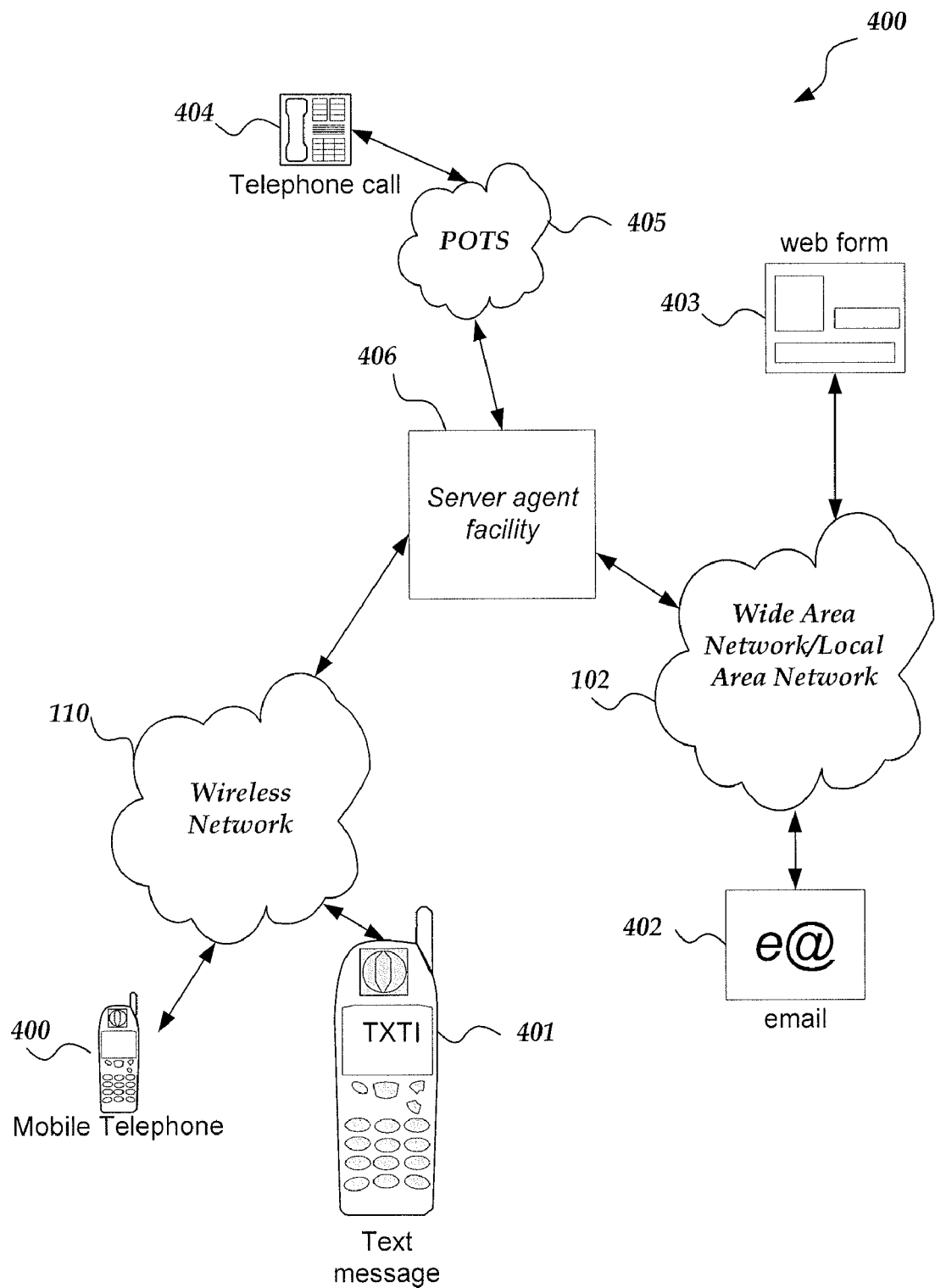
FIG. 4 shows a functional block diagram illustrating one embodiment of several interfaces employable to configure and/or send requests to the server agent facility.

FIG. 4 shows functional block diagram 400 illustrating one embodiment of several interfaces employable to configure and/or send requests to server agent facility 406. As shown in the figure, should a user desire to receive information at a mobile device, the user may send a request for the information to server agent facility 406. In addition to the request for information, the request may also include predefined instructions. Also, shown in the figure, a request for information may be made orally by telephone call 404. The request may also be made with the aid of a prompt (not shown), web-form 403, a menu, text message 401, email 402, instant message (IM), mobile telephone 400 call, and the like.

Generally, a request for information is provided to server agent facility 406, which operates substantially similar the server agent facility shown in FIG. 2. There typically are several types of requests, including one-off requests, event-based requests, and time-based requests. The request may be sent to the server agent facility using mobile telephone 400 connected to wireless network 110. Mobile telephone 400 may be the same as or distinct from mobile device 106 of FIG. 1. While mobile telephone 400 is presently shown as coupled to wireless network 110, it is not necessary that mobile telephone 400 and mobile device 106 be coupled to the same network. Rather, mobile device 106 could be wirelessly coupled, instead, to WAN over network 102, or a similar arrangement.

Server agent facility 406 is configured to provide a user utilizing mobile telephone 400 with an interface such as a voice menu, which enables the user to communicate a request in orally, phone button signals, and/or a combination of the above. The interface may include a voice recognition module to capture words or predetermined commands spoken by the user. Furthermore, the interface may include an intelligent language recognition module to accommodate a plain spoken language, and reduce the use of predefined commands.

In one embodiment, a user may communicate a request by use of telephone 404 coupled to a land line, such as Plain Old Telephone Service (POTS) 405. This type of request may be made and processed in a manner similar to a request made with mobile telephone 400.

Alternatively, a user may communicate a request by means of text message 401. The text message may be, for example, a Short Message Service (SMS) message, or a similar protocol. Text message 401 may be conveyed using a mobile device, a client computer, a land line telephone, mobile telephone 400, and the like. An interface included in or in communication with server agent facility 406 receives and processes a request in the text message.

Web-form 403 also may be provided to a client. Web-form 403 can be provided by a web-server module included in or coupled to server agent facility 406. The user may fill in information including a request in web-form 403 and then perform an action, such as pressing a button that instructs the client to send information towards server agent facility 406. Other software and communication protocols may also be used to communicate a request over network 102 to server agent facility 406. These include, but are not limited to instant messaging, internet relay chat, file transfer protocol, and the like.

Figure 5:
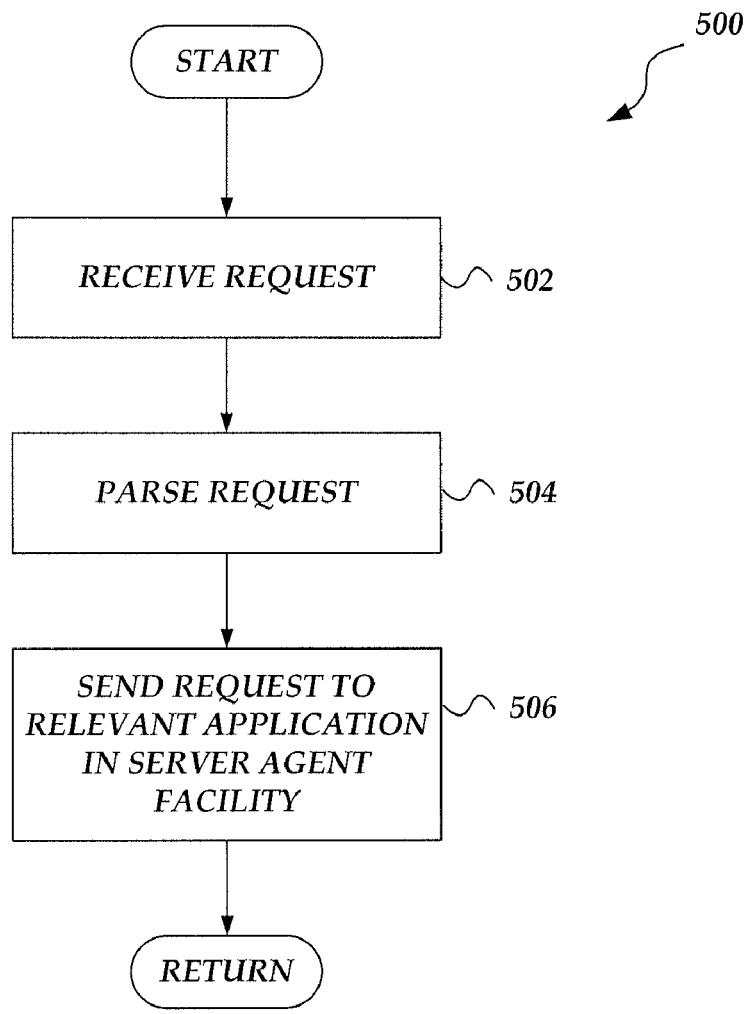
FIG. 5 illustrates a logical flow diagram generally showing one embodiment of a process for relaying requests to the server agent facility.

FIG. 5 illustrates a logical flow diagram generally showing one embodiment of process 500 for relaying requests to the server agent facility. In one embodiment, process 500 is implemented in server computer 108 of FIG. 1.

Process 500 begins, after a start block, at block 502 where a request for information is received from a mobile device. Processing flows next to block 504, where the received request is parsed. Parsing of the received request may include employing a speech recognition application, program, script, or the like. It may also include parsing the request for information for predefined commands, syntax, and so forth. The request may be parsed into a predefined format such that it may be more readily processed by another module in the server agent facility. Processing continues to block 506 where the parsed request is sent to the relevant module or modules in the server agent facility configured to further processing of the request. The relevant module or modules depends on a particular embodiment. For example, one of the agents within the agent module may be employed to further process the request. In any event, upon completion of block 506, processing returns to a calling process to perform other actions.

Figure 6:
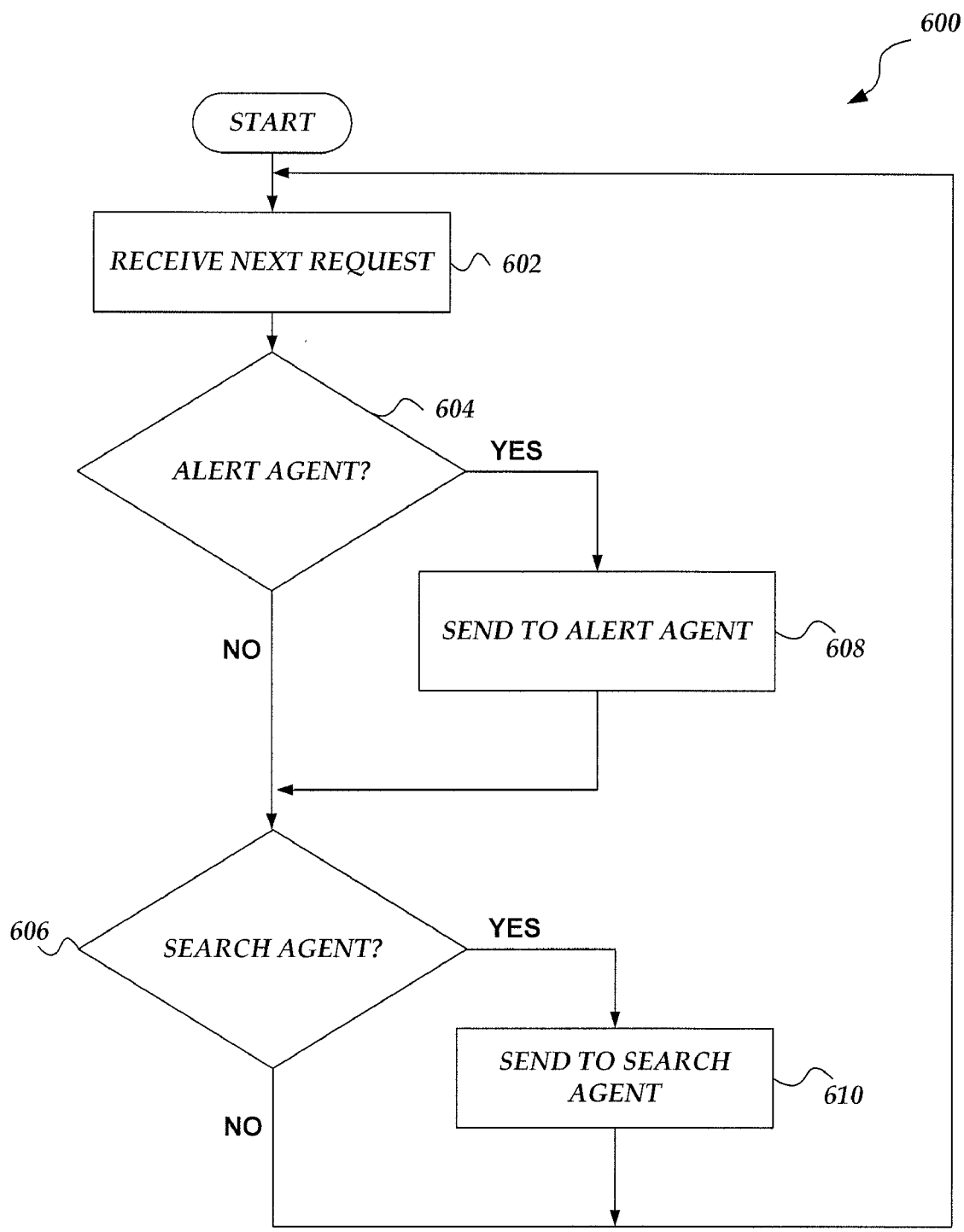
FIG. 6 illustrates a logical flow diagram generally showing one embodiment of a process of relaying requests to various agents within the server agent facility.

FIG. 6 illustrates a logical flow diagram generally showing one embodiment of a process of relaying requests to selected agents within the server agent facility. The request may be triggered in various forms, including one-off, event-based, and/or time-based requests. In particular, as shown in the figure, the request may be relayed to a search agent or an alert agent. However, the invention is not so constrained, and other agent types may be employed by the overall invention, although, they are not described in process 600. Process 600 of FIG. 6 may be implemented in server computer 108 of FIG. 1.

As shown in FIG. 6, process 600 begins, after a start block, at block 602 where a request for information is received within the server agent facility. Processing flows next to decision block 604 where a determination is made whether the request encompasses actions that may be serviced by an alert agent, such as described above in conjunction with FIG. 2. If the request may be serviced by the alert agent, processing branches to block 608; otherwise, processing continues to decision block 606. At block 608, the alert agent may operate to collect information associated with the received request employing a process such as is described below in conjunction with FIG. 8. Information that may be collected may, for example, include, information associated with a triggering event, such as a change in a stock price, and the like. Virtually any alert information may be collected by the alert agent. Process 600 then continues to decision block 606.

At decision block 606, a determination is made whether the received request encompasses actions that may be serviced by a search agent. If a search agent is to be employed, processing branches to block 610, where the search agent is employed to service the request for information. The search agent may query a database, file, a network infrastructure, and the like, in search of information that may be responsive to a query within the request for information. In one embodiment, the search agent may employ a process such as described below in conjunction with FIG. 7. Upon completion of block 610, or if a search agent is not to be employed, processing is configured to loop back to block 602 to monitor for the receipt of a next request for information.

Figure 7:
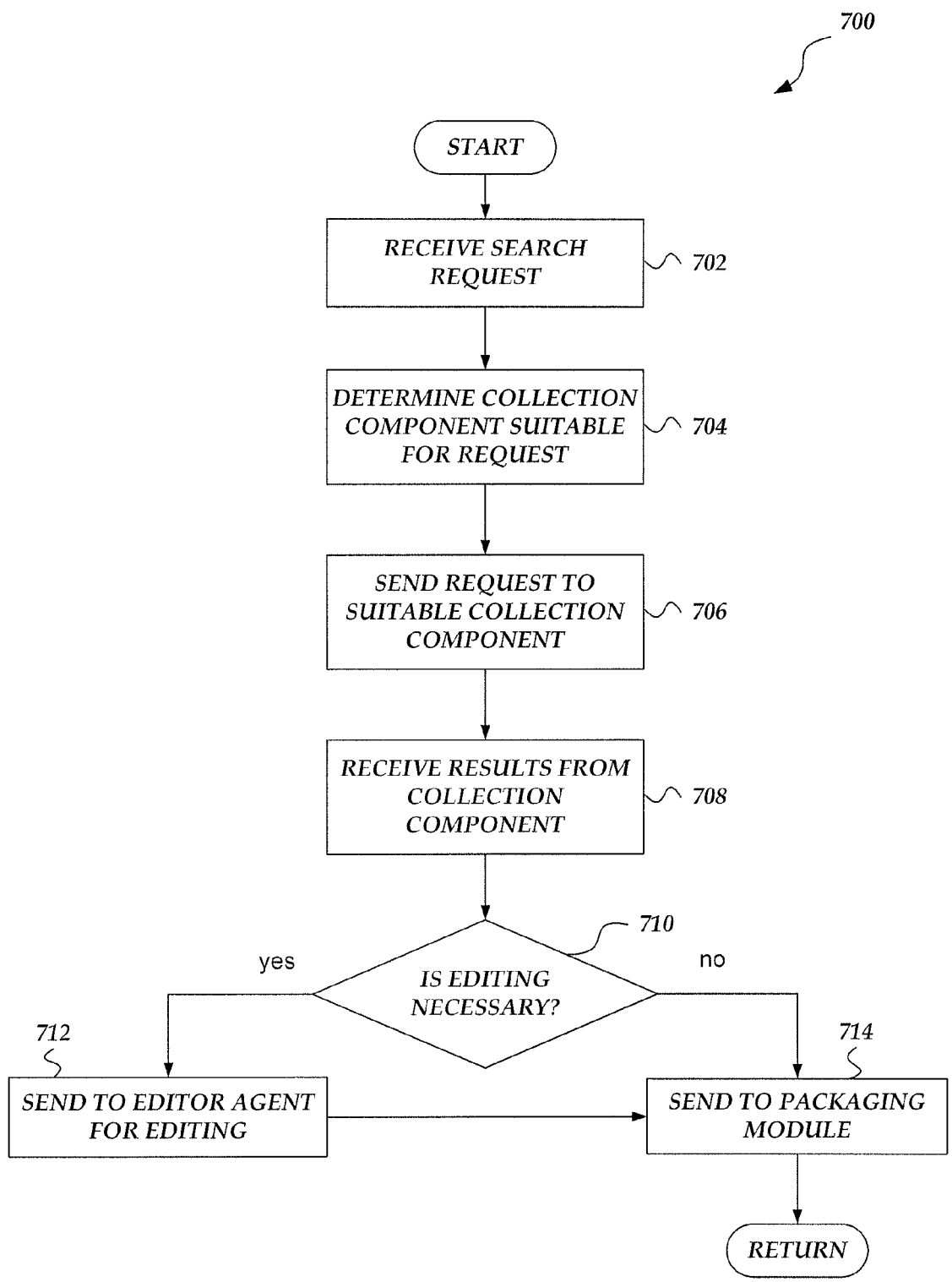
FIG. 7 illustrates a logical flow diagram generally showing one embodiment of a process of managing a search request.

FIG. 7 illustrates a logical flow diagram generally showing one embodiment of process 700 of managing a search request. In one embodiment, process 700 is called from block 610 of FIG. 6. Additionally, process 700 may be implemented within search agent 216 of FIG. 2.

Process 700 begins, after a start block, at block 702, where the search request is received. Processing moves next to block 704 where a collection component that is suitable for processing the request is determined. Different collection components may be associated with different fields within the request, combination of fields, and/or search approaches. For example, one set of fields may be better satisfied by collecting information through a third party collection component. In any event, once the collection component is determined, processing flows to block 706, where the request is forwarded to the determined collection component. In one embodiment, the request is modified at block 704, prior to sending it to the determined collection component. Such modifications may include, but are not limited to reformatting the request and/or associated fields into a format suitable for use by the determined collection component.

Processing next proceeds to block 708, where results to the collection request are received from the determined collection component. Processing then continues to decision block 710, where a determination is made whether any editing of the results is to be performed. Editing may be performed, for example, to place the returned results in a format better useable by the user. Moreover, such editing may be based on any of a variety of criteria, including, but not limited to predefined criteria specified by the user, a characteristic of the user's computing device, a browser format, and the like. For example, a user may wish to receive only the top ten hits of a search, or a user may wish to receive only a specific metric about a certain stock. In any event, if editing is to be performed processing branches to block 712 where the results are sent to an editor agent. When editing is completed, or if editing is not to be performed, process 700 flows to block 714, where the results are sent to be packaged for delivery to the user. One embodiment of a process for packaging the results is described in more detail below in conjunction with FIG. 11. Upon completion of block 714, process 700 returns to a calling process to perform other actions.

Figure 8:
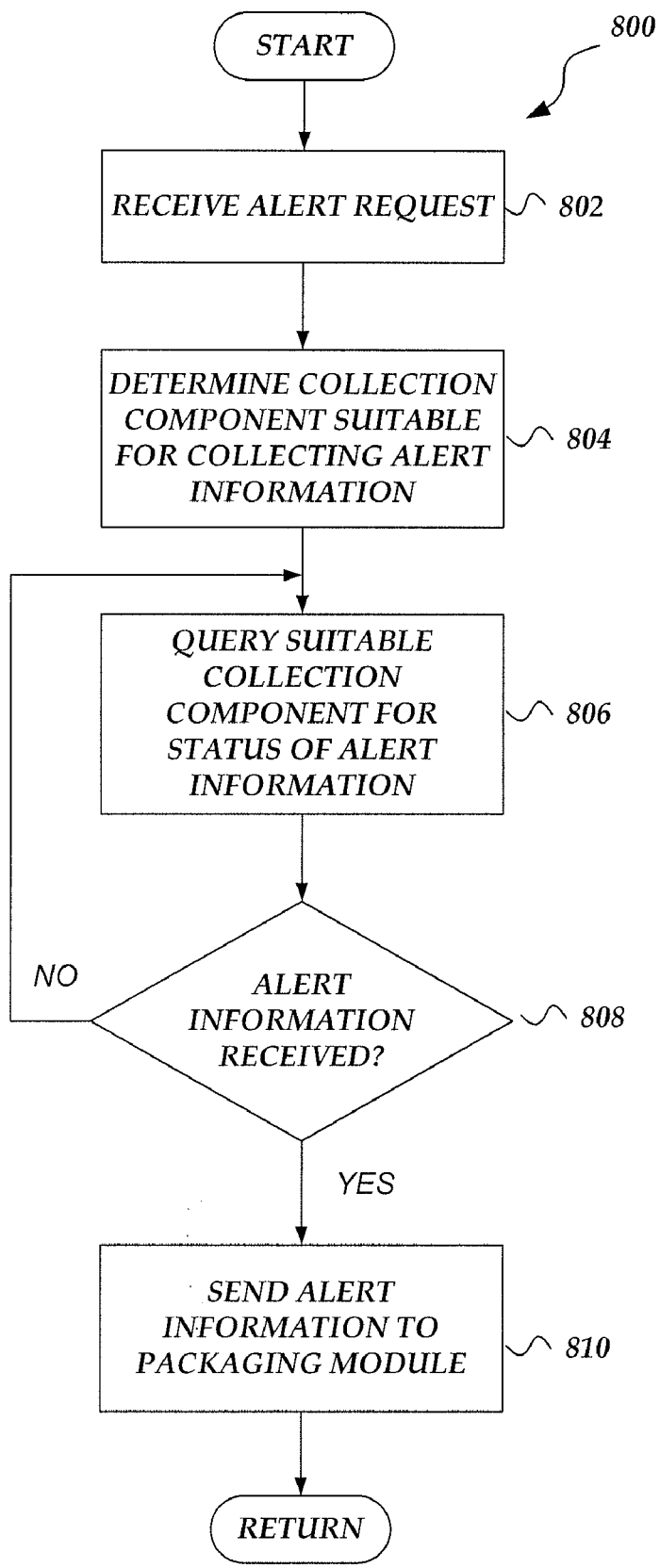
FIG. 8 illustrates a logical flow diagram generally showing one embodiment of a process of managing an alert request.

FIG. 8 illustrates a logical flow diagram generally showing one embodiment of process 800 of managing an alert request. Process 800, for example, may be implemented within alert agent 218 of FIG. 2.

Process 800 begins, after a start block, at block 802 where the alert request is received. In one embodiment, the alert request is received from block 608 of FIG. 6. As described briefly above, an alert request may be associated with an event, condition, and the like, that when satisfied, enables information associated with the alert being sent to the user.

Processing moves next to block 804, where a collection component is determined that is suitable for collecting the requested alert information. The determination of the collection component may be based on a variety of criteria, including the type of alert information requested. Moreover, one collection component may be better configured to handle a particular alert request than another collection component. In any event, once the appropriate collection component is determined, processing flows to block 806, where the determined collection component is queried about the status of the alert information.

Processing continues to decision block 808, where it is determined whether alert information is received in response to the query. In one embodiment, alert information is received when the determined collection component so determines that the alert request is satisfied. If it is determined that no alert information is received in response to the query, processing loops back to block 806 where another query is performed, until the alert request is satisfied, such as information associated with the alert request is received. The alert may also be configured to time out after a predetermined time. For example, should the user want to know a change in a stock price within a given time, and the stock does not change, the alert information may indicate that the stock did not change within the given time.

However, at decision block 808, if alert information has been received, processing flows to block 810, where the received alert information is sent to be packaged for delivery to the user. In one embodiment, the received alert information is sent to process 1100 described below in conjunction with FIG. 11. In another embodiment, the received alert information is sent to a packaging module substantially similar to the packaging module described above in conjunction with FIG. 2. In any event, upon completion of block 810, processing returns to a calling process to perform other actions.

Figure 9:
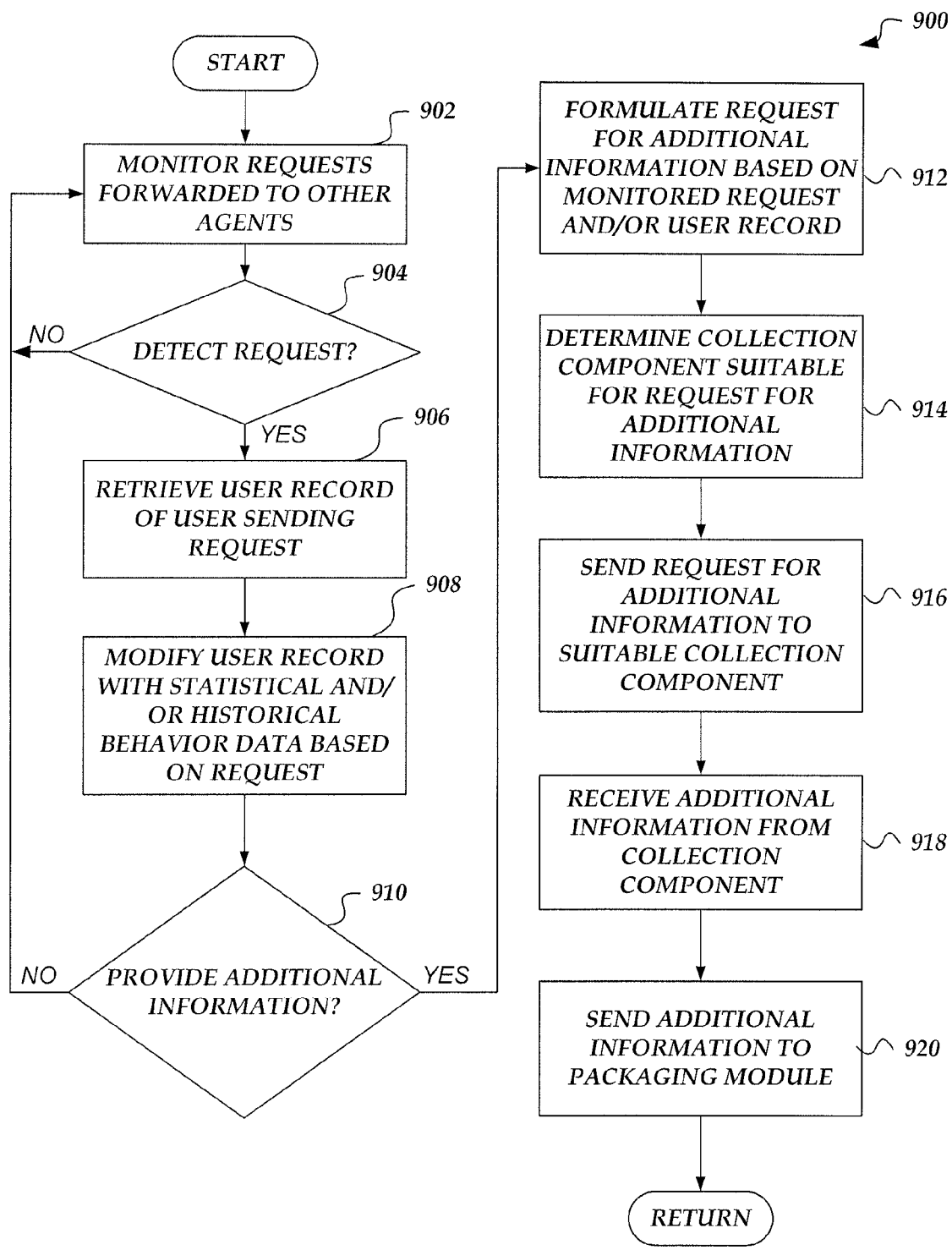
FIG. 9 illustrates a logical flow diagram generally showing one embodiment of a process for use by a forwarding agent.

FIG. 9 illustrates a logical flow diagram generally showing one embodiment of a process for use by a forward looking agent. Thus, in one embodiment, process 900 of FIG. 9 is implemented in forward looking agent 220 of FIG. 2.

Requests from the user typically are not specifically directed to a forward looking agent. Instead, the forward looking agent may monitor requests directed to other agents, determine predictive information, and provide the predicative information to the user. As such, process 900 begins, after a start block, at block 902, where requests to other agents are monitored. Process 900 moves next to decision block 904, where a determination is made whether a request sent to another agent is detected. If so, processing flows to block 906; otherwise, processing loops back to 902 to continue to monitor for alerts to other agents.

At block 906, a user record associated with the user sending the request is retrieved. The user record includes information associated with the user sending the request, such as, for example, statistical and behavioral information, configuration information applicable for the user, billing information, and so forth. The user record may include one or more data records, and portions of it may be saved at one or more locations in different formats.

Processing flows next to block 908, where the user record is modified with statistical, historical, and/or behavior data, based, in part, on the detected request. The user record may be modified based on a variety of statistical and/or historical behavior data. For example, statistical data may have been collected that is associated with a number of requests sent by the user, by another user, and the like. Statistical, historical, and/or behavior data may also be associated with a type of request, time associated with a request, frequency of a type of request, and the like. Similarly, the statistical, historical, and/ or behavior data may include information associated with keywords in a request, a context, or substance of a request, where the requests are sent, and the like. In one embodiment, a user setting associated with the detected request may be employed to assist in determining what statistical, historical, and/or behavior data is to be collected and employed to modify the user record. For example, in another embodiment, the user may have indicated that a prior request is to be saved and returned to the user at some later time. Virtually, any statistical, historical, and behavior data may be collected and employed to modify the user record. Moreover, such statistical, historical, and behavior data may also be employed for other uses, including, but not limited to, billing, research, and the like.

Process 900 next flows to block 910, where a determination is made whether additional information is to be provided to modify the user record. Such additional information may not be directly responsive to the detected request. However, providing such information may be desirable for a variety of other reasons, such as being indirectly helpful to the user. Thus, for example, if a user requests information about a novel, additional information about the author of the novel may be sent, although such information was not directly requested by the user. The determination of whether to provide additional information may depend on a variety of things, including user criteria, a user setting, a configuration of the server agent facility, the request itself, and so forth. In one embodiment, additional information may be provided for a predefined type of request that may be defined by a keyword, a subject matter, a frequency, or the like. Furthermore, the determination to provide additional information may be based on a type of user, a predefined set of users, or the like.

In any event, if no additional information is to be provided processing loops back to block 902; otherwise, processing continues to block 912.

At block 912, a request for additional information is formulated based on the request that was detected and/or the user record. For example, the request for additional information may be based on keywords found in the detected request. The request for additional information may also be based on keywords found in the detected request in addition to a presence of certain historical, statistical, behavior, or other information in the user record. Thus, if the user record indicates that the user has performed a predefined number of searches about geographical location A, but the monitored requests refers to geographical location B, then the request for additional information may refer to information about transportation options from geographical location A to geographical location B.

In block 914, the request for additional information is sent to a suitable collection component. In one embodiment, the request for additional information is sent to collection component to perform actions substantially similar to those described below in conjunction with FIG. 10. However, the invention is not so limited, and another process may be employed. For example, it may be determined that the suitable collection component includes one that is enabled to collect and store additional information associated with advertising information, and the like. In this example, a collection component specifically configured to access advertising information may instead be employed. That advertising collection component may then employ its own process to search for, collect, and provide, the additional advertising information. In any event, upon completion of block 916, processing flows to block 918, where the additional information is obtained. Processing then continues to block 920 where the received additional information is sent to be packaged in a format suitable for delivery to the user. In one embodiment, the additional information is sent to a packaging module, substantially similar to that described above in conjunction with FIG. 2. In another embodiment, prior to sending the additional information to be packaged, the additional information is sent for editing. In that embodiment, the editing may be performed, for example, by employing editor agent 214 of FIG. 2. However, the invention is not so limited, and another editor or agent may be employed to perform actions on the additional information before it is sent for packaging. In any event, upon completion of process 900, processing returns to a calling process to perform other actions.

Figure 10:
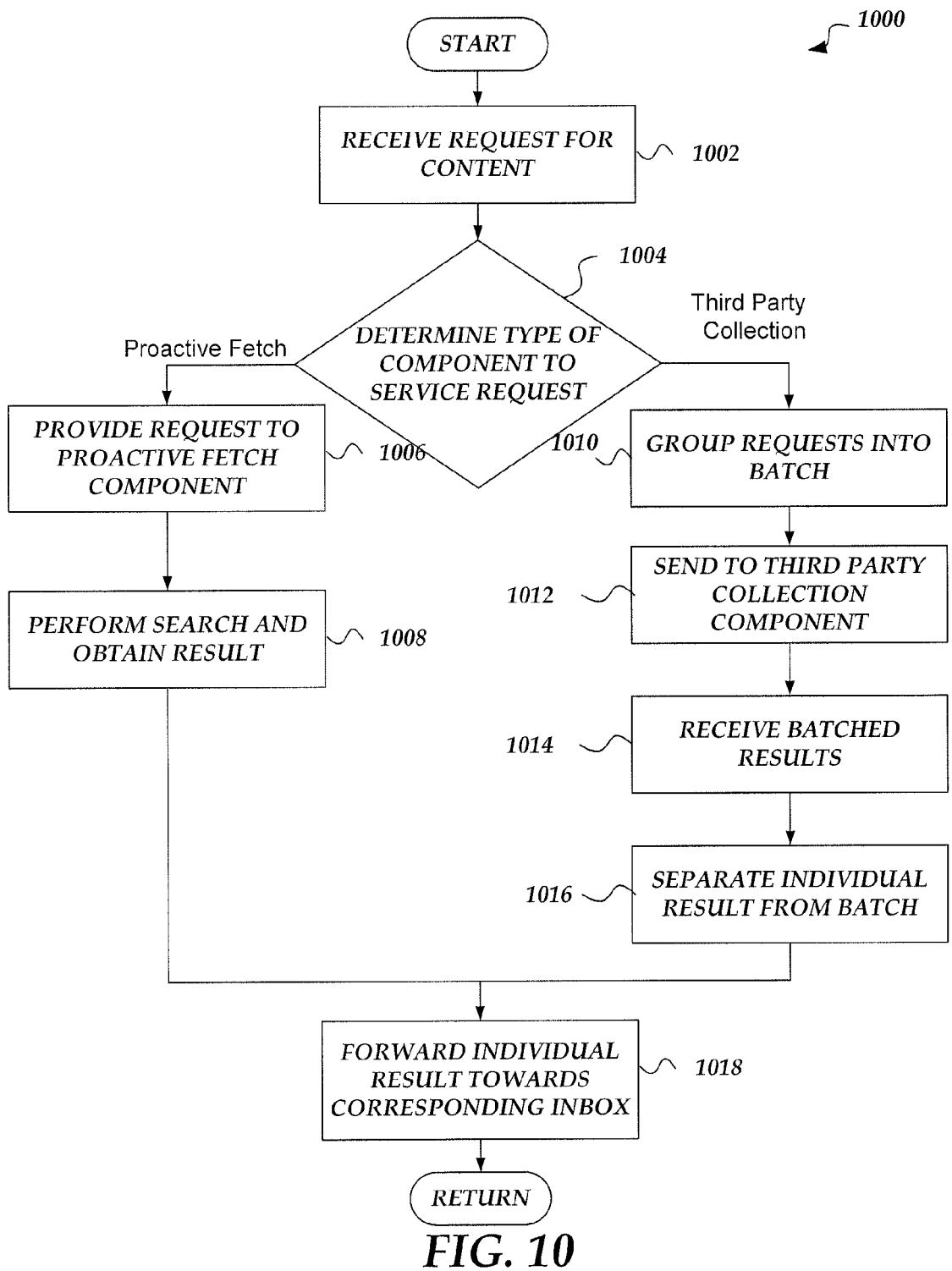
FIG. 10 illustrates a logical flow diagram generally showing one embodiment of a process of collecting information.

FIG. 10 illustrates a logical flow diagram generally showing one embodiment of process 1000 of collecting information employing a collection module, such as shown in FIG. 2. Process 1000 may be implemented, for example, in server computer 108 of FIG. 1.

Process 1000 begins, after a start block, at block 1002, where a request for content is received. The request may be received from a variety of sources, including, but not limited to an agent within the server agent facility of FIG. 2, and the like. For example, in one embodiment, the request for content is received from process 900 of FIG. 9. Upon receipt of the request for content, processing flows to decision block 1004, where a determination is made as to the type of collection component to be employed to service the request for content. As shown in FIG. 10, and FIG. 2, two possible collection components are illustrated: a proactive fetch and a third party collection component. However, the invention is not so limited, and additional collection components may be implemented for use in servicing the request for content.

Typically, if the request for content refers to generally accessible information, such as information generally available through the Internet, through the server agent facility, and the like, the process flows to the proactive fetch direction. However, where the request for content refers to information that is not generally available through such sources, the process may employ a third party collection component. This type of information may include, for example, hotel reservation information, flight pricing information, and the like. In one configuration, an operator of the server agent facility may enter into an agreement with a third party (such as an airline), wherein the server agent facility will have access to certain otherwise proprietary information, or the like, belonging to the third party. Such access may be typically performed through the third party collection module. Thus, if it is determined that the request for content may be serviced by the proactive fetch component, process 1000 flows to block 1006; otherwise, process 1000 flows to block 1010 for processing by the third party collection component.

At block 1006, the request for content is forwarded to the proactive fetch component for processing. Moving to block 1008, the proactive fetch component performs a search based on the request, obtains a result, and returns the result. In one embodiment, the actions of block 1008 employ process 700 described above, in conjunction with FIG. 7. Upon completion of block 1008 processing flows to block 1018.

At block 1010, however, several requests for content may be batched together. Although, the invention is not limited to batching of requests, it may be performed in one embodiment, to reduce costs, simplify common requests for content, and the like. In any event, if so desired, the request is batched with other requests. Upon completion of block 1010, processing continues to block 1012, where the batched requests (where so batched) are sent to the third party collection component for processing. Processing continues next to block 1014, where the results associated with different batched requests are received. Next, processing flows to block 1016, where the batched results are separated. Processing then continues to block 1018.

At block 1018, the results provided are sent towards the user's inbox. In one embodiment, the results are sent back to the requesting agent for further processing, such as preparing the results or delivery to the user by employing a packaging module, or the like. Upon completion of block 1018, process 1000 then returns to a calling process to perform other actions.

Figure 11:
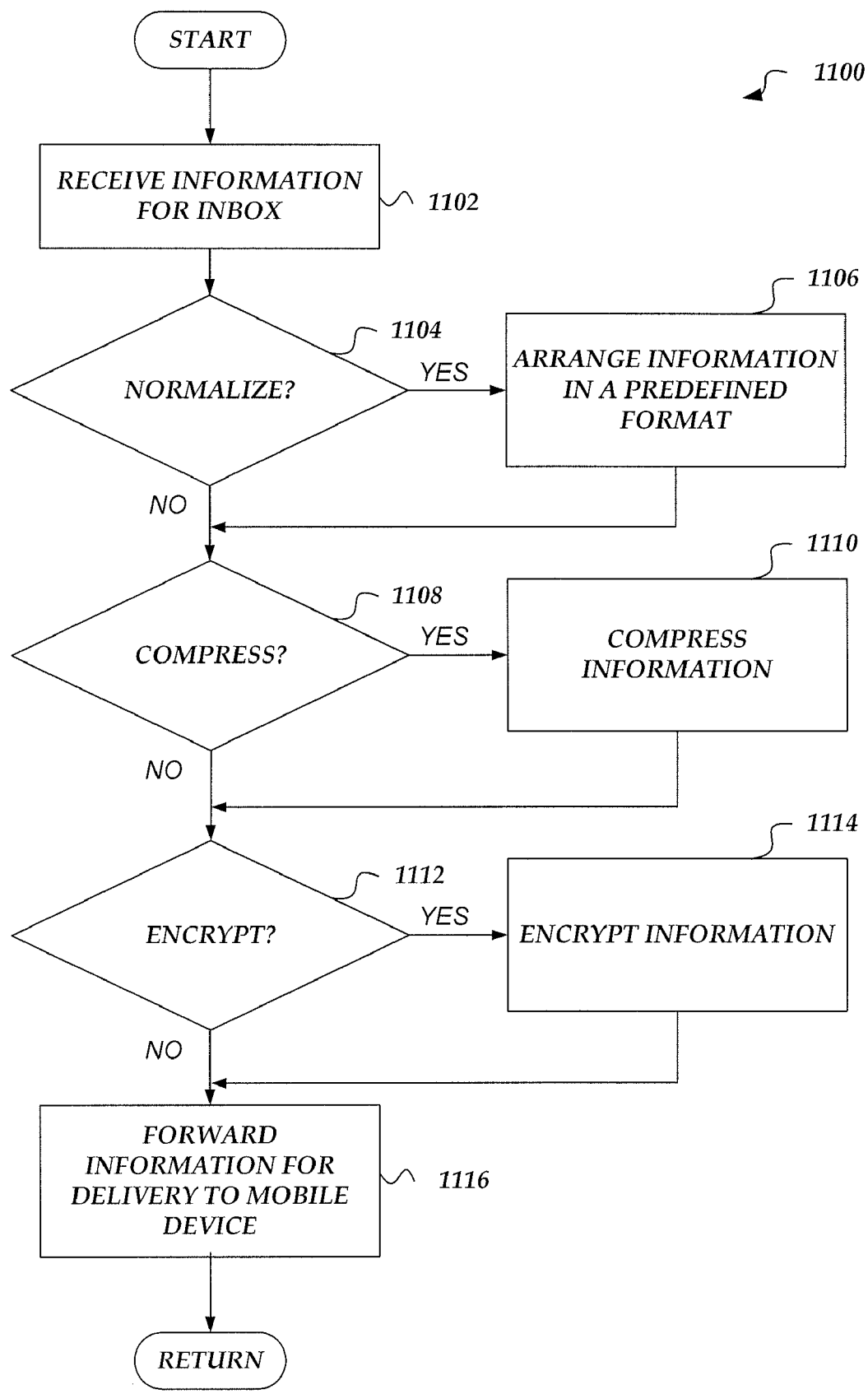
FIG. 11 illustrates a logical flow diagram generally showing one embodiment of a process of packaging information for delivery to a mobile device.

FIG. 11 illustrates a logical flow diagram generally showing one embodiment of a process of packaging information for delivery to a mobile device. In one embodiment, process 1100 of FIG. 11 is implemented within the server agent facility described above in conjunction with FIG. 2.

Process 1100 of FIG. 11 begins, after a start block, at block 1102, where information is received that is intended for delivery the inbox of the mobile device. Such information may include, for example, the results of a search received from a search agent, alert information received from an alert agent, predictive, historical, behavior information, or the like. Upon receipt of such information, processing flows to decision block 1104, where a determination is made whether the information is to be normalized. Normalization of the information may include modifying a format of the information. This determination can be made based on variety of factors, such as, but not limited to, the information itself, the type of the mobile device to which the information is to be directed, and the user settings. For example, a mobile device may not be able to display certain formats of information. In that instance, the information may be reformatted for viewing on that mobile device. Similarly, a user may have indicated that information is to be delivered in a predefined format.

In any event, if it is determined that the information should be normalized, flow proceeds to block 1106, where the format of the information is changed; otherwise, processing continues to decision block 1108. In one embodiment, block 1106 may be implemented by normalize component 208 of FIG. 2. Normalization of the information may result in changes in a variety of characteristics of the information, including, but not limited to, resizing of an image, changing a format/encoding of an image, changing a font size, resizing text, regrouping text, and so forth. Similarly, information organized according to a presentation language or a mark up language, such as HTML, may be reformatted, reorganized, and the like, by, for example, manipulating the content to change a presentation format. Information may also be reformatted into a markup language, or if already in a markup language, may be placed in a different mark up language. For example, the information may be placed in a Synchronized Multimedia Integration Language (SMIL) compliant format for presentation by the mobile device. Processing then flows to decision block 1108.

At decision block 1108, a determination is made whether the information should be compressed. This determination may be made based on a variety of factors, including a configuration of the server agent facility, a type of the mobile device, an available bandwidth, a user settings, and so forth. A type of compression may also be determined based, at least in part, on a characteristic of the network connection, and an capability of the mobile device to decompress the information. Compression use may also be based on, for example, consideration of possible data deterioration due to "lossy" compression or the like. In any event, if it is determined that compression is to be performed, processing flows to block 1110; otherwise, processing flows to decision block 1112.

At block 1110, the information is compressed. In one embodiment, compression is achieved employing compress component 210 of FIG. 2. Compression may be performed according to one or more compression mechanisms, including, but not limited to, run length encoding, minimum redundancy coding, discrete fractal transform compression, fractal compression, and so forth. In fact, virtually any compression mechanism may be employed to compress the information. Upon completion, processing continues to flow to decision block 1112.

At decision block 1112, a determination is made whether encryption is be performed. Encryption is directed towards ensuring privacy, of the information. Encryption may also be used for copy protection. In any event, the determination whether to encrypt the information may be based on a variety of factors including, but not limited to, a configuration of the server agent facility, a type of the mobile device, a type of the information, a user settings, and so forth. If it is determined that encryption is to be performed, processing flows to block 1114; otherwise, processing flows to block 1116.

At block 1114, any of a variety of encryption mechanisms may be employed to encrypt the information, including, but not limited to public key encryption, symmetric key encryption, hybrid encryption, and the like. Upon completion of the encryption of the information, processing flows to block 1116.

At block 1116, the information is forwarded for delivery to the mobile device. In one embodiment, the information is forwarded to an interface module, such as described above in conjunction with FIG. 2. In another embodiment, a process, such as described in FIG. 12 is employed at block 1116 to prepare the information for delivery to the mobile device.

Figure 12:
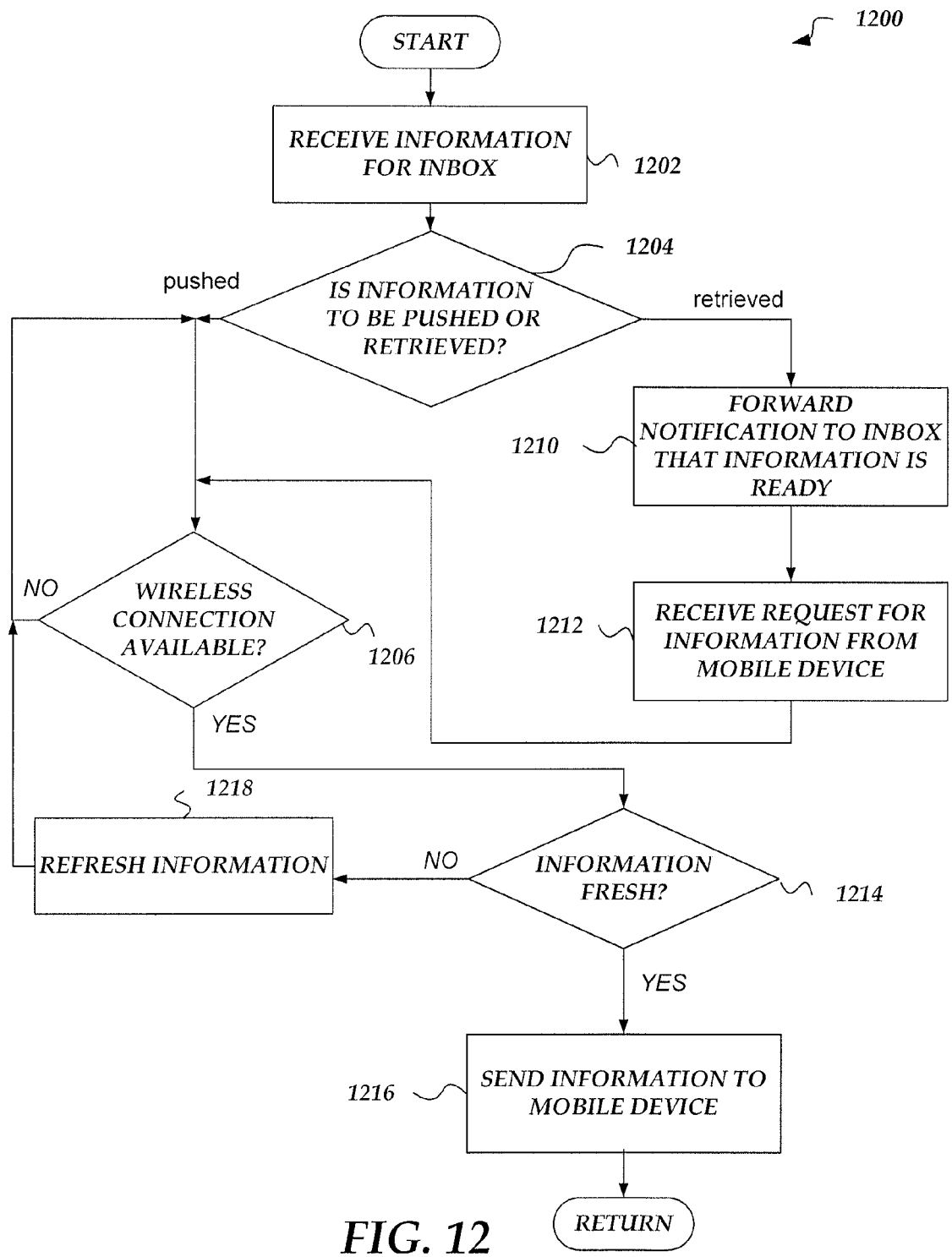
FIG. 12 illustrates a logical flow diagram generally showing one embodiment of a process of managing an interface to the mobile device, in accordance with the present invention.

FIG. 12 illustrates a logical flow diagram generally showing one embodiment of a process of managing an interface to a mobile device. Process 1200 of FIG. 12 may be implemented, for example, within the interface module of FIG. 2.

Process 1200 begins, after a start block, at block 1202, where information is received that is intended for delivery to the mobile device. Typically, the information is received from a packaging module, such as described in conjunction with FIG. 11, but it may also be received from other components of the server agent facility, such as, for example one of the agents, or the collection module.

Upon receipt of the information, processing flows to decision block 1204, where a determination is made whether the received information is to be pushed to or retrieved by the mobile device. This determination may be made based on the a variety of criteria, including, but not limited to, a user setting, a type of the mobile device, a type of information, and the like.

If it is determined that the information is to be retrieved by the mobile device, processing continues to block 1210, where a notification is forwarded to an inbox of the mobile device, indicating that the information is available. The notification may be in virtually any format, or form, including, for example, a text message, an SMS message, an Instant message, an email, and the like. Processing next flows to block 1212, where a request for the information is received from the mobile device. Processing then flows to decision block 1206.

At decision block 1206 a determination is made whether a wireless connection is currently available that includes sufficient bandwidth for sending the information. Although a notification message may have been sent at block 1210, the bandwidth may not now be sufficient for sending the information. Many existing wireless networks support different types of connections with different bandwidth capabilities. For example, the typical wireless telephone network, may support a standard connection for sending short messages and voice communication, as well as a data connection (e.g., 1×CDMA connection) for sending relatively large amounts of data. Thus, the determination of block 1206 is made in accordance with the amount of information being sent, and the bandwidth availability to send that information. If it is determined that there is insufficient bandwidth or the connection has dropped out, processing loops back through block 1206, until the connection is available and has sufficient bandwidth. However, when the connection is available with sufficient bandwidth, processing flows to decision block 1214.

At decision block 1214, it is determined whether the information to be sent is still fresh. Information may have become outdated while the interface module is waiting for a connection with sufficient bandwidth is available to the mobile device. The time it takes for a certain item of information to become outdated may depend on a variety of criteria, such as a type of information. Thus, at decision block 1214 a predefined list of several information types, and associated values indicating the time (e.g., a freshness time) that must elapse for the associated information type to become outdated at examined. Some types of information may also be considered to be never outdated, e.g., have an infinite freshness time. In one embodiment, however, decision block 1214, may be deleted, optionally executed based on other predefinable criteria, or the like. However, if it is determined that the information is to be refreshed, processing branches to block 1218; otherwise, processing proceeds to block 1216, where the information is sent to the mobile device. Upon completion of block 1216, processing returns to a calling process to perform other actions.

At block 1218, however, the information may be refreshed, for example, by performing another search for the information, re-requesting the collection of the information, and the like. Upon refreshing the information, processing loops back to decision block 1206.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of operations for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for providing information to a mobile device over a network comprising:
   a transceiver for receiving and sending information to the mobile device; and
   a processor configured to perform actions, including:
      collecting information to be sent to the mobile device over the network;
      packaging the collected information into a format useable at the mobile device;
      if the network device determines that the mobile device is inaccessible, waiting until the mobile device is accessible, and independent of a request from the mobile device performing a refresh of the collected information in part by re-collecting the information and then sending the refreshed information to the mobile device.

2. The network device of claim 1, wherein collecting the information further comprises:
   receiving a request for information from the mobile device;
   performing a query for the requested information;
   performing another query for information related to the requested information but not constituting a response to the request for information; and
   providing the requested information obtained from the query with the related information from the other query to form the collected information.

3. The network device of claim 1, wherein if the network device determines that the mobile device is inaccessible further comprises:
   determining if the mobile device is inaccessible based on if a network bandwidth to the mobile device is below a threshold, and if the bandwidth is below the threshold, indicating that the mobile device is inaccessible.

4. The network device of claim 1, wherein collecting the information is performed at the network device using an agent module comprising a search agent and a forward looking agent module.

5. The network device of claim 1, wherein packaging the collected information further comprises at least one of compressing the collected information or encrypting the collected information.

6. The network device of claim 1, wherein collecting information further comprises:
determining if a request for information to be collected can be batched with one or more other requests for information, wherein at least one of the one or more other requests for information is received from a second client device; and
if the request can be batched with one or more other requests, performing a batched request for the requested information.

7. A mobile device that is useable to receive information from a server device over a network, the mobile device comprising:
a transceiver that is arranged to receive and to send messages over the network to the server device; and
a processor that is configured and arranged to perform actions, comprising:
sending a request for information to the server device, wherein the server device is configured to perform a search for the information, and to collect the information requested;
if a network connection between the mobile device and the server device has a bandwidth below a threshold or is otherwise inaccessible, waiting for the network connection to be above the threshold and the network connection to be accessible to the server device; and
receiving the information requested from the server device, wherein the server device is further configured to perform a refresh of the collected information at least during the inaccessibility of the mobile device by in part performing another search for the information in absence of receiving another request for the information from the mobile device, and wherein the received information includes the refreshed information.

8. The mobile device of claim 7, wherein receiving the information further comprises receiving additional information that is associated with an alert.

9. The mobile device of claim 7, wherein receiving the information further comprises receiving information from the server device that is related to the requested information but does not constitute a response to the request for information.

10. The mobile device of claim 7, wherein receiving the information further comprises receiving additional information beyond the requested information based on a search by the server device using in part behavioral data of a user of the mobile device.

11. The mobile device of claim 10, wherein the additional information is also refreshed by performing another search by the server device for the additional information if the mobile device is inaccessible, and independent of receiving by the server device another request for information.

12. A system useable to provide information to a client device over a network, comprising:
a memory for storing a plurality of modules; and
a processor executing the plurality of modules, including:
an agent module that is configured to perform actions, including collecting information based in part on performing a searching for the information, wherein at least some of the information is associated with a request for information from the client device;
a packaging module that is configured to receive the collected information and to prepare the collected information into a format useable by the client device; and
a delivery agent that is configured and arranged to receive the packaged information, and to determine if the client device is accessible, and if the client device is determined to be inaccessible, waiting until the client device is accessible, absent another request from the client device, employing in part the agent module and the packaging module to perform a refresh of the collected information, re-packaging the refreshed information and sending the refreshed and re-packaged information to the client device over the network.

13. The system of claim 12, wherein agent module is configured to perform a query for additional information that is related to the request for information but does not constitute a response to the request, wherein at least some of the additional information includes advertisement information.

14. The system of claim 13, wherein performing the refresh further comprises performing a refresh of the additional information.

15. The system of claim 12, wherein collecting information further comprises, in part, collecting information based on a result of receiving an alarm condition, and wherein at least some of the collected information further comprises a notification of a presence of the alarm condition.

16. The system of claim 12, wherein collecting the information further comprises filtering the collected information using an editor agent.

17. A method for use in providing information to a client device over a network, comprising:
receiving at a server device a request for information from the client device over the network;
collecting the requested information;
performing a query for additional information that is related to the request but does not constitute a response to the request;
at the server device, if the client device is inaccessible over the network, waiting until the client device is accessible over the network, absent another request for the information from the client device, performing a refresh by re-collecting the information and performing another query for the additional information, and sending the refreshed information to the client device over the network.

18. The method of claim 17, wherein performing the query for additional information further comprises, employing historical or behavioral data obtained about a user of the client device to predict what additional information to obtain during the query.

19. The method of claim 17, wherein the server device is configured to determine if the client device is inaccessible based in part on if a bandwidth of a connection between the server device and the client device is below a threshold.

20. The method of claim 17, wherein the additional information further comprises push information.

* * * * *

UNITED STATES PATENT AND TRADEMARK OFFICE
CERTIFICATE OF CORRECTION

PATENT NO. : 7,818,397 B2
APPLICATION NO. : 12/030129
DATED : October 19, 2010
INVENTOR(S) : Zhaowei Charlie Jiang et al.

It is certified that error appears in the above-identified patent and that said Letters Patent is hereby corrected as shown below:

Title Page, Item (56)

On page 2, in column 2, under "Foreign Patent Documents", line 3, delete "WO-01/78319" and insert -- WO-01/76319 --, therefor.

In column 12, line 13, delete "mark up" and insert -- markup --, therefor.

In column 12, line 18, delete "mark up" and insert -- markup --, therefor.

In column 13, line 15-16, delete "the a" and insert -- the --, therefor.

Signed and Sealed this
Nineteenth Day of April, 2011

David J. Kappos
*Director of the United States Patent and Trademark Office*